Jan. 24, 1961 L. E. LEE 2,968,864
APPARATUS FOR ASSEMBLING RESILIENT SEALS
Original Filed March 30, 1956

INVENTOR
LUTHER E. LEE

BY Claude Funkhouser
G. Q. O'Brien
ATTORNEYS

# United States Patent Office 2,968,864
Patented Jan. 24, 1961

2,968,864

APPARATUS FOR ASSEMBLING RESILIENT SEALS

Luther E. Lee, 6625 Eastern Ave., Takoma Park 12, Md.

Original application Mar. 30, 1956, Ser. No. 575,284, now Patent No. 2,877,070, dated Mar. 10, 1959. Divided and this application Oct. 8, 1958, Ser. No. 766,162

2 Claims. (Cl. 29—235)

(Granted under Title 35, U.S. Code (1952), sec. 266)

The invention described herein may be manufactured and used by or for the Government of the United States of America for governmental purposes without the payment of any royalties thereon or therefor.

This application is a division of copending patent application Serial No. 575,284, filed March 30, 1956 in the name of Luther E. Lee for Fluid Pressure Seal, now Patent No. 2,877,070.

The present invention relates to apparatus for assembling a fluid pressure seal of a type which is satisfactory for either low or extremely high pressures wherein an outer Teflon ring exhibiting properties of a low coefficient of friction contacts moving parts of a mechanism and an inner rubber-like O-ring contacts stationary parts of the mechanism so that the minimum of wear and a maximum of sealing efficiency is attained. For a more detailed description of the particular type of seal envisaged for use with the apparatus of the instant invention, reference is made to the afore-mentioned copending application.

One object of the present invention resides in the provision of apparatus which will effectively assemble a fluid pressure seal of a type useful in conjunction with piston and cylinder arrangements wherein extremely low, intermediate and extremely high pressures are encountered.

A further object of the present invention is to provide tools by which a sealing device can be assembled with facility and without the use of intricate or complex machinery.

Another object of the invention resides in the provision of apparatus for assembling a fluid sealing device which will be economical and safe to use.

Another purpose of the invention resides in the provision of apparatus for assembling fluid pressure seals which lends itself readily to use in mass production operations.

Another aim of the invention is the provision of apparatus for assembling resilient seals which apparatus is characterized as being inexpensive to manufacture and of such construction that it will exhibit long wearing characteristics.

Other objects and many of the attendant advantages of this invention will be readily appreciated as the same becomes better understood by reference to the following detailed description when considered in connection with the accompanying drawings wherein:

49—KELLY—49814 Day Patents Dec. 30

Figure 3:
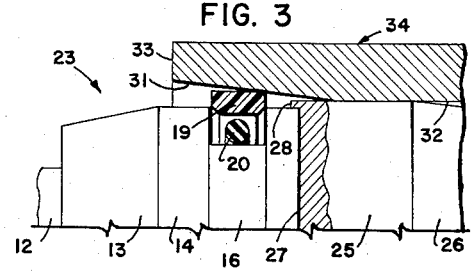
Figure 4:
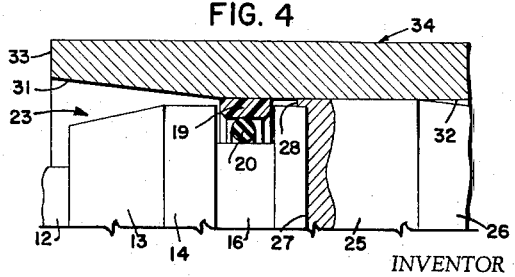

Fig. 3 is a fragmentary view partially in elevation and partially in section, illustrating the apparatus in a position to apply inwardly directed pressure to the sealing ring during assembly of the ring on the piston; and Fig. 4 is a view similar to Fig. 3, illustrating the apparatus in a final or ring confining position whereby the ring is maintained in a predetermined position for a predetermined period of time.

Figure 1:
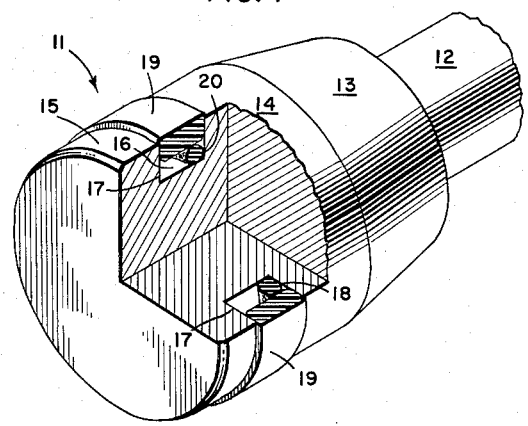
Fig. 1 is a perspective view of a piston with a fluid pressure seal assembled thereon by the apparatus of the present invention, a portion of the piston being shown broken away to better represent the relationship of several parts of the seal.

Referring now to Fig. 1, there is shown a fluid pressure seal which has been assembled by the apparatus of the present invention. Such a seal comprises essentially a surface engaging Teflon ring where the Teflon ring moves relative to the surface and an inner relatively stationary but deformable O-ring made for example of rubber, which sealing structure will provide a long-lasting, durable and satisfactory seal for low, intermediate, and extremely high pressures.

A piston member or other reciprocating member adapted to be utilized under heavy fluid pressure is generally designated in Fig. 1 by the numeral 11 and may comprise a shaft 12, a tapered portion 13, and bearing portions 14 and 15 which may define therebetween an undercut portion or groove 16. Groove 16 may have side walls 17 and 18 respectively, and a bottom surface 22.

Disposed in the groove 16 may be an outer Teflon ring 19. Outer ring 19 hereinafter described as the Teflon ring may be composed of a stable synthetic plastic such as polymerized tetra-fluoroethylene known by the name Teflon. This material has a low coefficient of friction which is of the order of 0.1 with respect to metal surfaces as compared to a coefficient of friction of the order of 0.45 for the rubber of which the O-ring 20 may be composed. Teflon will bend and restore to normal shape but it will not compress appreciably or flow under normal operating conditions. Thus, an outer ring composed of this material will bend outwardly to completely seal the space between the piston assembly and the piston cylinder but will not flow into this space. In addition, a stable synthetic plastic material such as Teflon will resist high temperatures whereas conventional outer rings such as metal may become hard and brittle and may tear the inner O-ring. Also such stable synthetic plastic material will retain its shape after exposure to high temperatures and the shape of the outer ring serves to prevent excessive deflection of the O-ring even though the O-ring may become hard and brittle due to exposure to high temperatures.

In this specification the term "outer ring" is intended to mean the ring which moves appreciably relative to a bearing surface and the term "inner ring" refers to the O-ring designed for small movement relative to an opposite surface of an engine assembly. Experiment shows Teflon to be a fine material, however, it is contemplated that the more expensive material Kel–F may be utilized under some different ambient conditions and such use is within the scope of this invention. A description of the process for polymerizing tetrafluoroethylene may be found in the patent of Robert M. Joyce, Jr., Patent No. 2,394,243 for Process for Polymerizing Tetra-Fluoroethylene, patented February 5, 1946.

Figure 2:
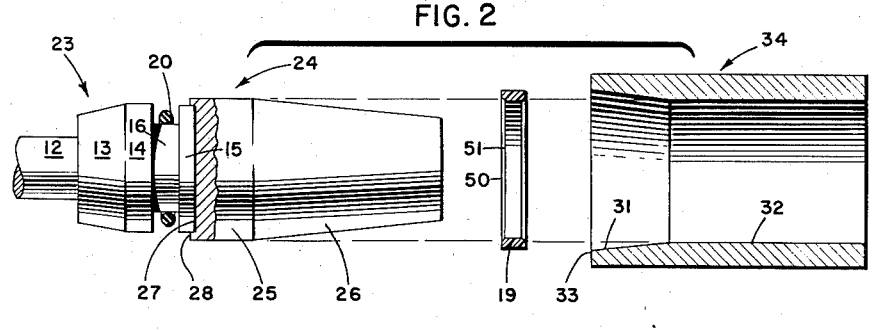
Fig. 2 is an exploded view, partly in section, illustrating the apparatus of the present invention employed for assembling the seal on the piston as illustrated in Fig. 1.

Fig. 2 illustrates the apparatus of the present invention for assembling a fluid pressure seal such as that illustrated in Fig. 1. As illustrated at the left end of Fig. 2, an O-ring 20 may be provided in the groove 16 of piston 11 by conventional means. The apparatus for assembling the finished article is generally designated by numeral 24 and has a straight surface portion 25, a tapered portion 26, and a recess 27 counterbored or otherwise formed in the tool end face 28. The Teflon ring 19 is expanded to a size such as that shown at the center of Fig. 2 whereby it can be easily slipped over the assembly 24 shown at the left of Fig. 2. The ring 19, Fig. 2, is shown in an expanded condition such, for example, as when the ring has been moved over the tapered portion 26 of tool 24 and onto portion 25 thereof. After the ring 19 is slipped over the straight portion 25 of tool 24 which is held against one end of piston 23, the ring is moved in overlying relationship with respect to groove 16 in the piston 23. It will be understood that the ring 19 may be forced over the portions 26 and 25 of tool 24 and in overlying relationship to groove 16 in any suitable manner such, for example, as by tool 34. When this occurs the tool 34 is slipped over the tool 24 with the ring 19 disposed within the tapered bore 31 and in engagement with the wall defining the bore. As the tool 34 is moved along the tool 24 the wall defining the bore 31 exerts a radially inwardly directed pressure on the ring 19 while the ring is cooling and thus the ring is gradually urged into the groove 16, movement of the ring being continued until the straight bore 32 of tool 34 is disposed over the ring 19 and the wall defining bore 32 is in engagement therewith. The tool 34 remains in this position for a sufficient length of time to allow final cooling and shrinking of the ring into the groove 16. After ring 19 has shrunk fitted into snug engagement with the deformable O-ring 20, tools 34 and 24 may be withdrawn.

Obviously many modifications and variations of the present invention are possible in the light of the above teachings. It is therefore to be understood that within the scope of the appended claims the invention may be practiced otherwise than as specifically described.

What is claimed is:

1. An apparatus for inserting a piston ring composed of polymerized tetra-fluorethylene material into a groove in a piston and for maintaining the piston ring therein for a predetermined period of time, said apparatus comprising a tool member having a tapered piston ring receiving portion and a straight cylindrical piston ring expanding portion at one end of said tapered portion, recess means including a shoulder formed at the terminal end of the cylindrical portion and receiving the piston for supporting the piston, tool member and piston ring in axial alignment, and a tubular tool movable over said tool member and having a tapered bore and a straight cylindrical bore in proximate relation with respect to said straight cylindrical piston ring expanding portion for moving and gradually applying inwardly directed pressure to the piston ring and for maintaining the piston ring within the groove for a predetermined period of time.

2. An apparatus for applying a sealing ring composed of a material having a low coefficient of friction into a groove in a piston and for maintaining the sealing ring therein in a predetermined position and for a predetermined period of time, said apparatus comprising a tool member having a tapered portion and a straight cylindrical portion for receiving and expanding the sealing ring in accordance with the size of the piston, means including a shoulder formed at one end of the tool member engageable by the piston for supporting the piston, tool member and the sealing ring in axial alignment, and a sleeve tool movable over the tool member, said sleeve tool having a tapered bore and a straight cylindrical bore for gradually applying inwardly directed pressure to the sealing ring and for maintaining the sealing ring within the groove in a predetermined position and for a predetermined period of time, said straight cylindrical bore being of a size larger than the size of said straight cylindrical portion.

References Cited in the file of this patent
UNITED STATES PATENTS

| | | |
|---|---|---|
| 606,675 | Marcy | July 5, 1898 |
| 2,139,541 | Farnsworth | Dec. 6, 1938 |
| 2,549,602 | Hopps | Apr. 17, 1951 |
| 2,691,402 | Swanson | Oct. 12, 1954 |
| 2,697,870 | Zucker | Dec. 28, 1954 |
| 2,739,374 | Kaiser | Mar. 27, 1956 |
| 2,764,160 | Alexander | Sept. 25, 1956 |